United States Patent [19]

Seki et al.

[11] Patent Number: 4,949,271
[45] Date of Patent: Aug. 14, 1990

[54] CURVED SURFACE CREATION METHOD

[75] Inventors: Masaki Seki; Koji Samukawa; Osamu Hanaoka, all of Tokyo, Japan

[73] Assignee: Fanuc Ltd, Minamitsuru, Japan

[21] Appl. No.: 265,797

[22] PCT Filed: Feb. 17, 1988

[86] PCT No.: PCT/JP88/00159
§ 371 Date: Oct. 18, 1988
§ 102(e) Date: Oct. 18, 1988

[87] PCT Pub. No.: WO88/06312
PCT Pub. Date: Aug. 25, 1988

[30] Foreign Application Priority Data

Feb. 20, 1987 [JP] Japan .................................. 62-37278

[51] Int. Cl.$^5$ .............................................. G06F 15/46
[52] U.S. Cl. ............................ 364/474.29; 364/474.14
[58] Field of Search ................... 364/167, 191, 474.29, 364/474.14; 318/570

[56] References Cited

U.S. PATENT DOCUMENTS 4,569,014 2/1986 Kishi et al. ...................... 364/474.29
4,589,062 5/1986 Kishi et al. ...................... 364/474.29
4,755,927 7/1988 Kishi et al. ...................... 364/474.29
4,855,926 8/1989 Seki et al. ........................ 364/474.29

Primary Examiner—Jerry Smith
Assistant Examiner—Paul Gordon
Attorney, Agent, or Firm—Staas & Halsey

[57] ABSTRACT

A curved surface creation method suitable for use in creating two curved surfaces for coarse and finishing machining. A first space curve (1) is divided into N segments, a second space curve separately obtained is similarly divided into N segments and a curved surface for coarse machining is created by connecting corresponding i-th dividing points $R_i$ (i=1, 2, ...). Next, the first space curve (1), which is obtained by successively connecting the dividing points $R_i$ (i=1, 2, 3, ...), is divided into M (>N) segments, the second space curve is similarly divided into M segments and a curved surface for finishing machining is created by connecting the i-th dividing points $S_i$ (i=1, 2, 3, ...) of the first space curve (1), which is divided into M segments, with and the corresponding dividing points of the second space curve.

15 Claims, 5 Drawing Sheets 1, 2--SPACE CURVES 1,2--SPACE CURVES (a)

(b)

(c)

(d)

CURVED SURFACE CREATION METHOD

BACKGROUND OF THE INVENTION

1. Field of the Invention

This invention relates to a curved surface creation method and, more particularly, to a curved surface creation method suitable for use in creating two curved surfaces for coarse and finishing machining.

2. Description of the Related Art

As illustrated in FIG. 4, one method of creating a free curved surface entails obtaining two, i.e., first and second, space curves (base curves) $11a$, $11b$ [FIG. 4(a)], dividing each of the base curves $11a$, $11b$ into N segments [FIG. 4(b)], and connecting corresponding dividing points by straight lines, thereby forming a curved surface CS [FIG. 4(c)].

In this curved surface creation method, the base curves $11a$, $11b$ are specified by discrete point sequences $P_{li}(x_i, y_i, z_i)$ ($i=1, 2, \ldots$) and $P_{2j}(x_j, y_j, z_j)$ ($j=1, 2, \ldots$), respectively, as shown in FIG. 4(d). In order to obtain these sequences of points (base curves), a predetermined curved surface is generated in advance and curves in the XY plane are projected onto this curved surface.

FIGS. 5 and 6 are views for describing the processing for obtaining a sequence of points which specify a base curve. As shown in FIG. 5, let $L_c(j)$ express an intermediate section curve containing a j-th dividing point on a base curve BSCl of a curved surface 10, and let $L_r(i)$ express a curve obtained by connecting an i-th dividing point on each of the intermediate section curves $L_c(j)$ ($j=1, 2, 3, \ldots n$). A quadrilateral bounded by curves $L_c(j)$, $L_c(j+1)$, $L_r(i)$ and $L_r(i+1)$ shall be referred to as a "patch" PT (i,j). The four vertices Q1, Q2, Q3, Q4 of the patch PT (i,j) are stored in memory.

As shown in FIG. 6, points of intersection are where a curve CV in the X-Y plane intersects the sides of each projection patch obtained by projecting each patch onto the X-Y plane, and the coordinates of the points on the curved surface 10 corresponding to these points of intersection are computed. For example, four sides $i_a$, $i_b$, $j_a$, $j_b$ are obtained by projecting a predetermined patch P (m,n) on a three-dimensional curved surface onto the X-Y plane. Let P$_{1i}$, P$_{2i}$ represent the points of intersection between the curve CV and a predetermined two of these four sides, and let $(x_{li}, y_{li})$, $(x_{2i}, y_{2i})$ represent the coordinates of these points of intersection. Further, let $Q_1'$, $Q_2'$ denote the end points of the side $i_a$ intersected by the curve CV, let $Q_3'$, $Q_4'$ denote the end points of the side $i_b$ intersected by curve CV, let $Q_i$ ($i=1-4$) represent the points on the three-dimensional curved surface that correspond to the points $Q_i'$ ($i=1-4$), and let $(x_i, y_i, z_i)$ denote the coordinates of each of the points $Q_i$. Then, the Z coordinates $z_{li}$, $z_{2i}$ of the points $P_{li}'$, $P_{2i}'$ on the curved surface that correspond to the points of intersection $P_{li}$, $P_{2i}$ are calculated in accordance with the following equations:

$$z_{li} = z_1 + (z_2 - z_1)(x_{li} - x_1)/(x_2 - x_1)$$

$$z_{2i} = z_3 + (z_4 - z_3)(x_{2i} - x_3)/(x_4 - x_3)$$

Thus, the coordinates of the points $P_{li}'$, $P_{2i}'$ on the curved surface are, respectively, $(x_{li}, y_{li}, z_{li})$, $(x_{2i}, y_{2i}, z_{2i})$. The set of points $P_{li}'$, $P_{2i}'$ ($i=1, 2, \ldots$) on the curved surface represent the sequence of points defining the base curve.

Since numerical control (NC) machining ordinarily includes coarse machining and finishing machining, it is necessary to create a curved surface for coarse machining and a curved surface for finishing machining. When creating a curved surface for coarse machining in the prior art, the curved surface, namely the NC data, for coarse machining is prepared by obtaining the base curves $11a$, $11b$ (FIG. 4) through the above-mentioned method upon enlarging the length of each side of the patch PT of the curved surface 10 (FIG. 5). When creating a curved surface for finishing machining in the prior art, the curved surface, namely the NC data, for finishing machining is similarly prepared by obtaining the base curves $11a$, $11b$ through the foregoing method upon reducing the length of each side of the patch.

However, the processing for specifying the space curves that are the base curves requires a very long period of time. For this reason, considerable time is required to obtain the two curved surfaces, namely for coarse and finishing machining.

Summary of the Invention

An object of the present invention is to provide a curved surface creation method in which if one space curve is specified for either coarse machining or finishing machining, the other space curve can be specified in a simple manner. Thus it is possible to create the other curved surface in a short period of time.

According to the present invention, a first space curve is divided into N segments, a second space curve, separately obtained, is divided into N segments and a curved surface for coarse machining is created by connecting corresponding i-th dividing points $R_i$ ($i=1, 2, \ldots$).

Next, the first space curve, which is obtained by successively connecting the dividing points $R_i$ ($i=1, 2, 3, \ldots$) is divided into M (with M>N) segments, the second space curve is divided into M segments and a curved surface for finishing machining is created by connecting the i-th dividing point $S_i$ ($i=1, 2, 3, \ldots$) of the first space curve divided into M segments and the corresponding dividing point of the second space curve.

BRIEF DESCRIPTION OF THE DRAWINGS

FIG. 4 is a diagram view of a known curved surface creation method, and FIGS. 5 and 6 are diagrams for explaining a known method of creating space curves.

DESCRIPTION OF THE PREFERRED EMBODIMENT

Figure 1:
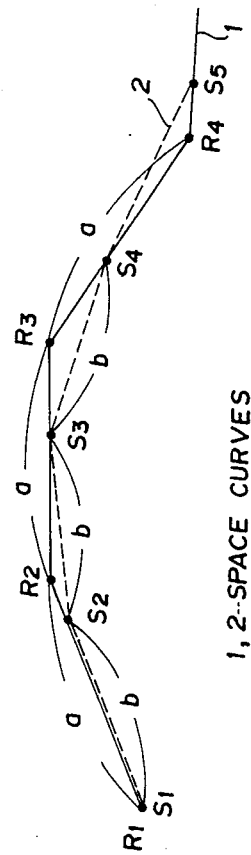
FIG. 1 is a of the present invention.

FIG. 1 is a general explanatory view of the present invention. Numeral 1 (the solid line) denotes a space curve specified as a sequence of points $R_i$ ($i=1, 2, 3, \ldots$) of pitch a. The numeral 2 (the dashed line) denotes a space curve specified as a sequence of points $S_i$ ($i=1, 2, 3, \ldots$) of pitch b (b<a).

Figure 2:
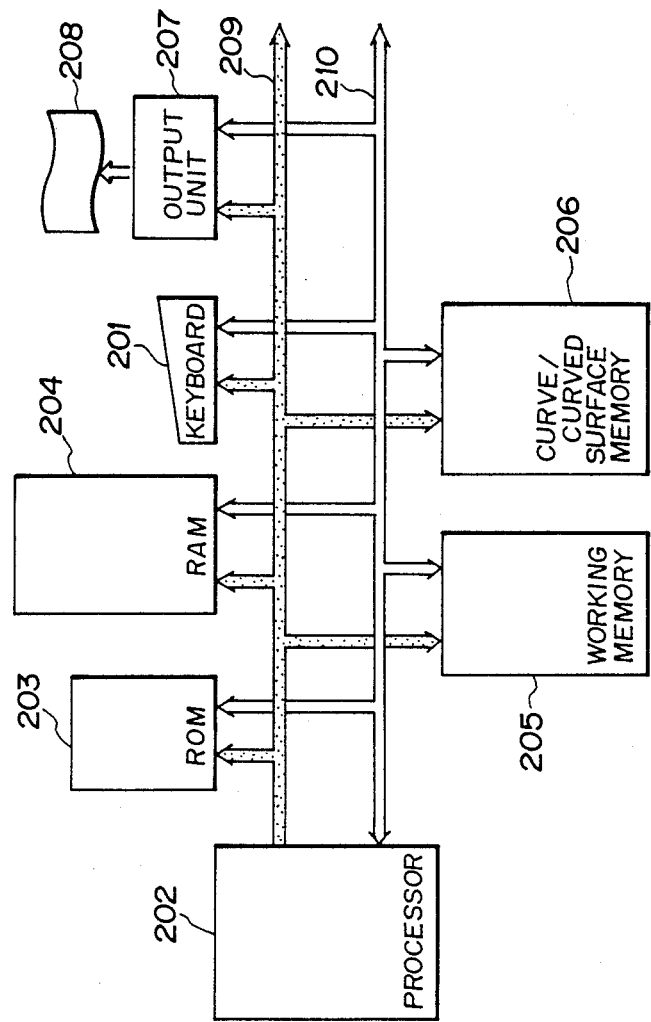
FIG. 2 is a block diagram of an apparatus for practicing the present invention.
Figure 3:
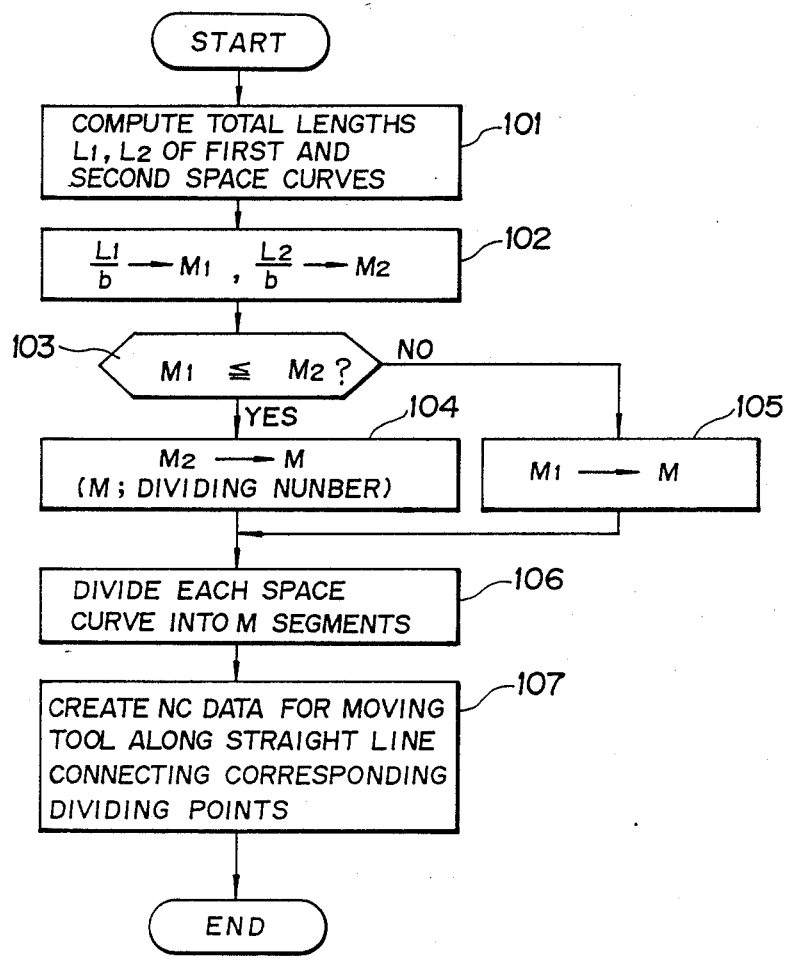
FIG. 3 is a flowchart illustrating processing according to the invention.

FIG. 2 is a block diagram of an apparatus nfor practicing an embodiment of the present invention, and FIG. 3 is a flowchart illustrating processing of the present invention. In FIG. 2, numeral 201 denotes a keyboard for data input; 202 denotes a processor; 203 denotes a ROM storing a control program; 204 denotes, after 205 a RAM; 205 denotes a working memory; 206 denotes a curve/curved surface memory for storing generated curves and curved surface data, 207 denotes an output unit for outputting generated curved surface data and NC data to an external storage medium 208 such as a paper tape or magnetic tape; 209 an address bus; and 210 a data bus.

Figure 4:
FIGS. 4 through 6 are diagrams for explaining the background of the present invention.
Figure 4:
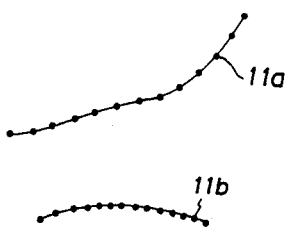
Figure 4:
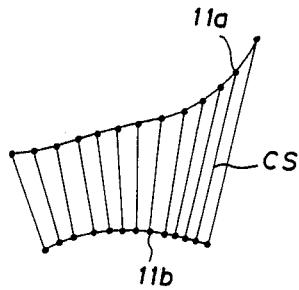
Figure 4:
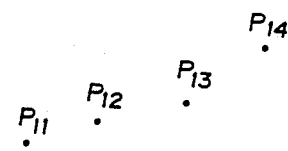
Figure 5:
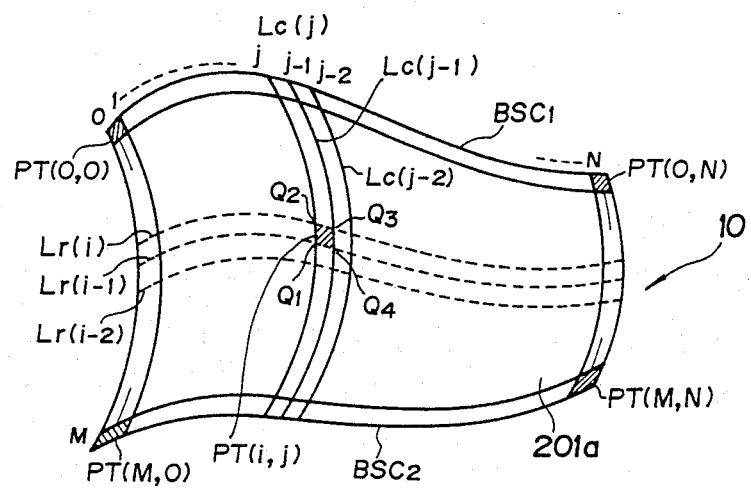
Figure 6:
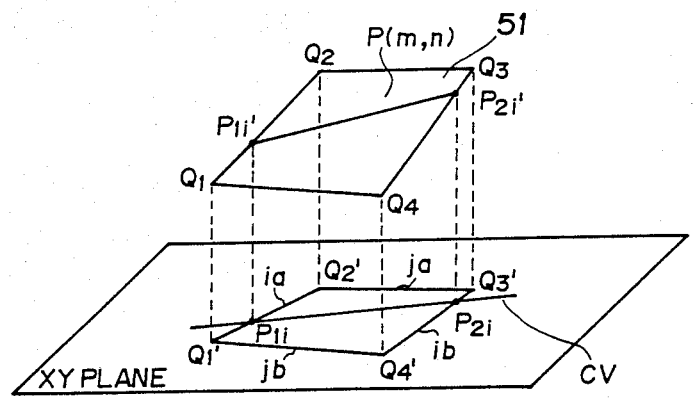

The processing of the present invention for creating a curved surface in will now be described in accordance with the flowchart of FIG. 3. It is assumed that a curved surface for coarse machining has been created in advance by a known method, for example, the method illustrated in FIGS. 4-6 as prior art. It is also assumed that the sequences of points constituting two base curves [corresponding to the base curves 11a, 11b in FIG. 4(a)] have already been stored in the curve/curved surface memory 206.

The processor 202 obtains the total lengths $L_1$, $L_2$ of the first and second space curves when each of the series of points $R_i$ (i=1, 2, ...) of the two base curves (one of which is assumed to be the space curve 1 in FIG. 1) specifying the curved surface for coarse machining is connected by straight line segments (step 101)

Next, the numbers of divisions $M_1$, $M_2$ at pitch b are computed (step 102) in accordance with the formulae $$L_1/b \rightarrow M_1, L_2/b \rightarrow M_2$$

using the preset pitch b for finishing machining (b may be inputted from the keyboard 201 or the like).

Thereafter, the numbers of divisions $M_1$, $M_2$ are compared in terms of magnitude and the larger is employed as a number of divisions M (see steps 103 through 105).

When the number of divisions M has been found, dividing pitches b (see FIG. 1), b' are obtained in accordance with the formulae $$L_1/M \rightarrow b, L_2/M \rightarrow b'$$

(where $M_1 > M_2$ is assumed to hold); Space curve 1 is divided into M segments at the designated pitch b. The other space curve (not shown) is similarly divided into M segments at the pitch b'. Next, the i-th dividing point $S_i$ (i=1, 2, 3, ...) of the space curve 1 divided by M and the i-th dividing point of the other space curve (not shown) are correlated and stored in the memory 206. When this is done, creation of the curved surface for finishing machining is completed (step 106). It should be noted that the space curve obtained by dividing at pitch b is as shown by the dashed line 2 in FIG. 1.

This is followed by the creation of NC data for moving a tool at a cutting velocity along a straight line connecting the two correlated dividing points (step 107). This ends all of the processing for curved surface creation.

Although the invention as been described on the assumption that the curved surface for coarse machining is obtained first, it is permissible to obtain the curved surface for finishing machining first and then find the curved surface for coarse machining through the foregoing method.

In accordance with the present invention, the arrangement is such that by dividing an already found space curve at a predetermined pitch and then connecting the dividing points, a new space curve in accordance with this pitch is created. Accordingly, a space curve having a different pitch can be specified in a simple manner and, hence, a curved surface can be created in a short period of time. Thus, in accordance with the invention, when a curved surface for either coarse machining or finishing machining has been prepared, the other curved surface can be created simply and within a short period of time.

We claim:

1. A curved surface creation method comprising the steps of:
   (a) obtaining first and second space curves each represented as a sequence of points;
   (b) creating a first curved surface by connecting first corresponding dividing points obtained by dividing the first and second space curves into N segments, where N is an integer, at predetermined pitches a and a', respectively;
   (c) dividing the first and second space curves into M segments, where M is an integer, at predetermined pitches b and b', respectively, forming second corresponding dividing points;
   (d) creating a second curved surface by connecting the second corresponding dividing points of the first and second space curves that have been divided into M segments in step (c); and
   (e) machining one of the first and second curved surfaces.

2. A curved surface creation method according to claim 1, wherein if a is greater than b and a' is greater than b', then the first curved surface is a curved surface for coarse machining and the second curved surface is a curved surface for finishing machining.

3. A curved surface creation method according to claim 2, wherein $L_1$, $L_2$ denotes lengths of the first and second space curves, respectively, and p denotes a pitch given for finishing machining,
   wherein a dividing number M is decided based on the larger of $L_1/p$ and $L_2/P$, and
   wherein $L_1/M$ and $L_2/M$ serve as pitches and b'.

4. A curved surface creation method according to claim 1, wherein if a is less than b and a' is less than b', then the first curved surface is a curved surface for finishing machining and the second curved surface is a curved surface for course machining.

5. A method for creating curved surfaces according to claim 1, wherein the curved surfaces represent numerical control data for use in course and finishing machining.

6. A method for creating a second curved surface from a first curve surface using first and second space curves, the first curve surface is generated by dividing the first and second space curves into N segments, where N is an integer, said method comprising the steps of:
   (a) determining first and second total lengths of the first and second space curves, respectively, based on the N segments of the first and second space curves corresponding to the first curve surface;
   (b) determining a division number M, where M is an integer, based upon the first and second total lengths and a predetermined pitch;
   (c) selecting the larger of the first and second total lengths as a total length;
   (d) determining first and second dividing pitches by dividing, respectfully, the first and second total lengths by the division number M;

(e) dividing the first space curve into M segments with a pitch equal to the first dividing pitch;
(f) dividing the second space curve into M segments with a pitch equal to the second dividing pitch;
(g) creating a second curved surface based upon corresponding segments generated by said dividing in steps (e) and (f); and
(h) machining one of the first and second curved surfaces;

7. A method for creating curved surfaces according to claim 6, wherein the curved surfaces represent numerical control data for use in coarse and finishing machining.

8. A method for creating curved surfaces according to claim 7, wherein said determining step (b) comprises the following substeps:
   (i) dividing each of the total lengths by the predetermined pitch to generate first and second division numbers; and
   (ii) selecting one of the first and second division numbers to be the division number M based upon the first and second division numbers with the greater magnitude.

9. A method for creating curved surfaces according to claim 8, wherein the first curved surface represents a curved surface for coarse machining when N is less than M.

10. A method for creating curved surfaces according to claim 9, wherein said creating step (g) comprises the substep of connecting corresponding segment points resulting from said dividing in steps (e) and (f) with straight line segments.

11. A method for creating curved surfaces using first and second space curves, comprising the steps of:
    (a) dividing the first and second space curves into N segments, where N is an integer;
    (b) creating a first curved surface based upon corresponding segments of the first and second space curves from said dividing sep (a);
    (c) determining first and second total lengths of the first and second space curves, respectively;
    (d) determining a division number M, where M is an integrer, based upon the first and second total lengths and a predetermined pitch;
    (e) selecting the larger of the first and second total lengths as a total length;
    (f) determining first and second dividing pitches by dividing, respectfully, the first and second total lengths by the division number M;
    (g) dividing the first space curve into M segments with a pitch equal to the first dividing pitch;
    (h) dividing the second space curve into M segments with a pitch equal to the second dividing pitch;
    (i) creating a second curved surface based upon corresponding segments generated by said dividing in steps (g) and (h); and
    (j) machining one of the first and second curved surfaces.

12. A method for creating curved surfaces according to claim 11, wherein said creating step (*i) comprises the substep of connecting corresponding segment points resulting from said dividing steps (g) and (h) with straight line segments.

13. A method for creating curved surfaces according to claim 12, wherein the curved surfaces represent numerical control data for use in coarse and finishing machining.

14. A method for creating curved surfaces according to claim 13, wherein the first curved surface represents a curved surface for coarse machining when N is less than M.

15. A method for creating curved surfaces according to claim 14, wherein said determining step (d) comprises the following substeps:
    (i) dividing each of the total lengths by the predetermined pitch to generate first and second division numbers; and
    (ii) selecting one of the first and second division numbers to be the division number M based upon the one of the first and second division numbers with the greater magnitude.

* * * * *

UNITED STATES PATENT AND TRADEMARK OFFICE
CERTIFICATE OF CORRECTION

PATENT NO. : 4,949,271

DATED : August 14, 1990

INVENTOR(S) : Masaki Seki et al.

Page 1 of 2

It is certified that error appears in the above-identified patent and that said Letters Patent is hereby corrected as shown below:

Front page, under Abstract [57],
    line 10, change "segments, the" to
        --segments. The--;
    line 15, delete "and".

Col. 1,   line 35, change "(j+1)," to
        --(j-1),--; and change "(1+1) to --(i-1)--;
    line 46, change "$P_1i$" to --$P_{1i}$--.

Col. 2,   line 47, after "a" insert --diagram illustrating the space curves--;
    line 54, delete "view";
    line 66, change "an apparatus nfor" to --an embodiment of an apparatus for--;
    line 67, delete "an embodiment of".

Col. 3,   line 3, change "denotes," to --denotes--;
    line 4, delete "after 205";
    line 10, after "210" insert --denotes--;
    line 12, delete "in".

Col. 5,   line 39, change "sep" to --step--.

UNITED STATES PATENT AND TRADEMARK OFFICE
CERTIFICATE OF CORRECTION

PATENT NO. : 4,949,271
DATED : August 14, 1990
INVENTOR(S) : Masaki Seki et al

It is certified that error appears in the above-identified patent and that said Letters Patent is hereby corrected as shown below:

Col. 6, line 19, change "(*i)" to --(i)--.

Signed and Sealed this

Eighteenth Day of February, 1992

Attest:

HARRY F. MANBECK, JR.

*Attesting Officer*     *Commissioner of Patents and Trademarks*